July 26, 1938.   D. B. LEE   2,124,922
VEHICLE VENTILATING WINDOW
Filed Oct. 2, 1933   4 Sheets-Sheet 3
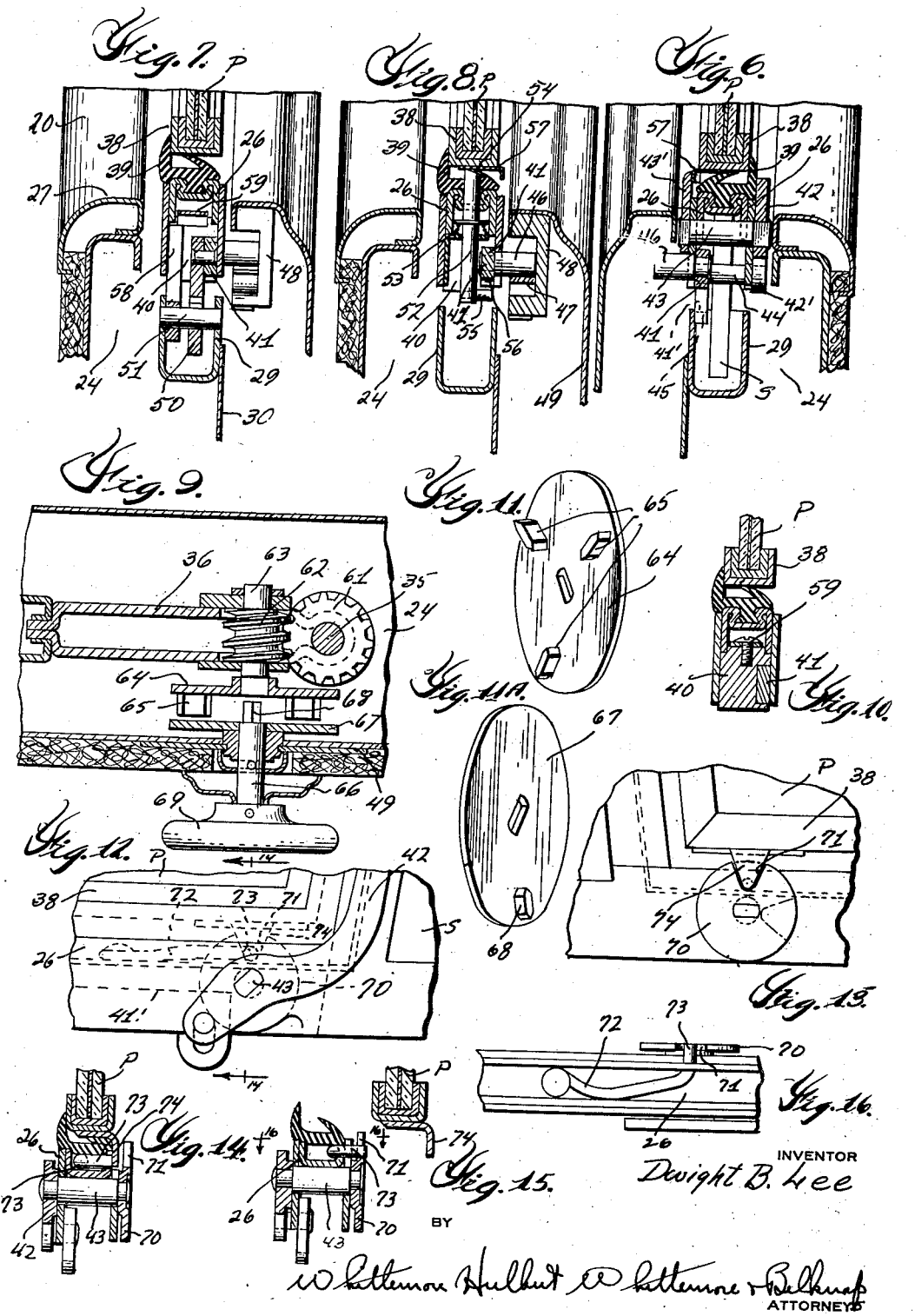
INVENTOR
Dwight B. Lee
BY
ATTORNEYS

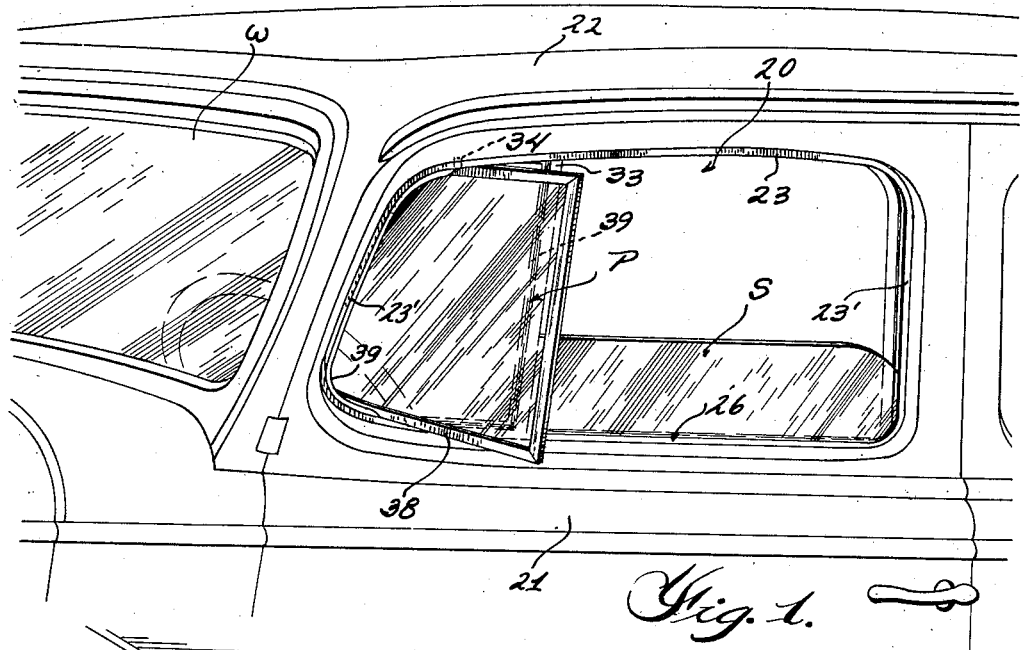
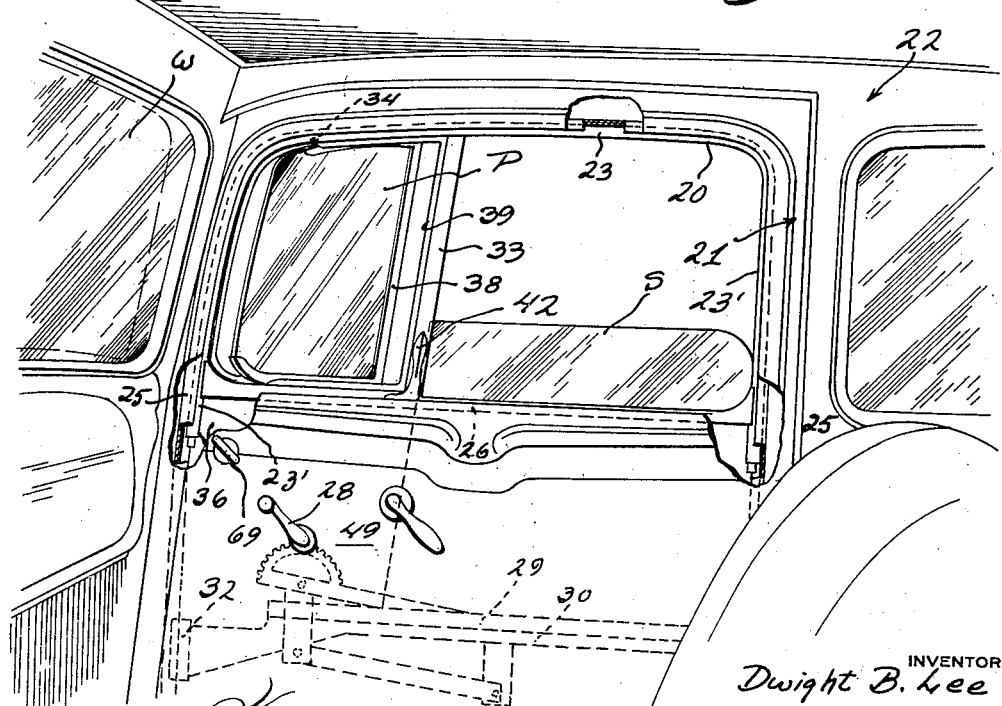

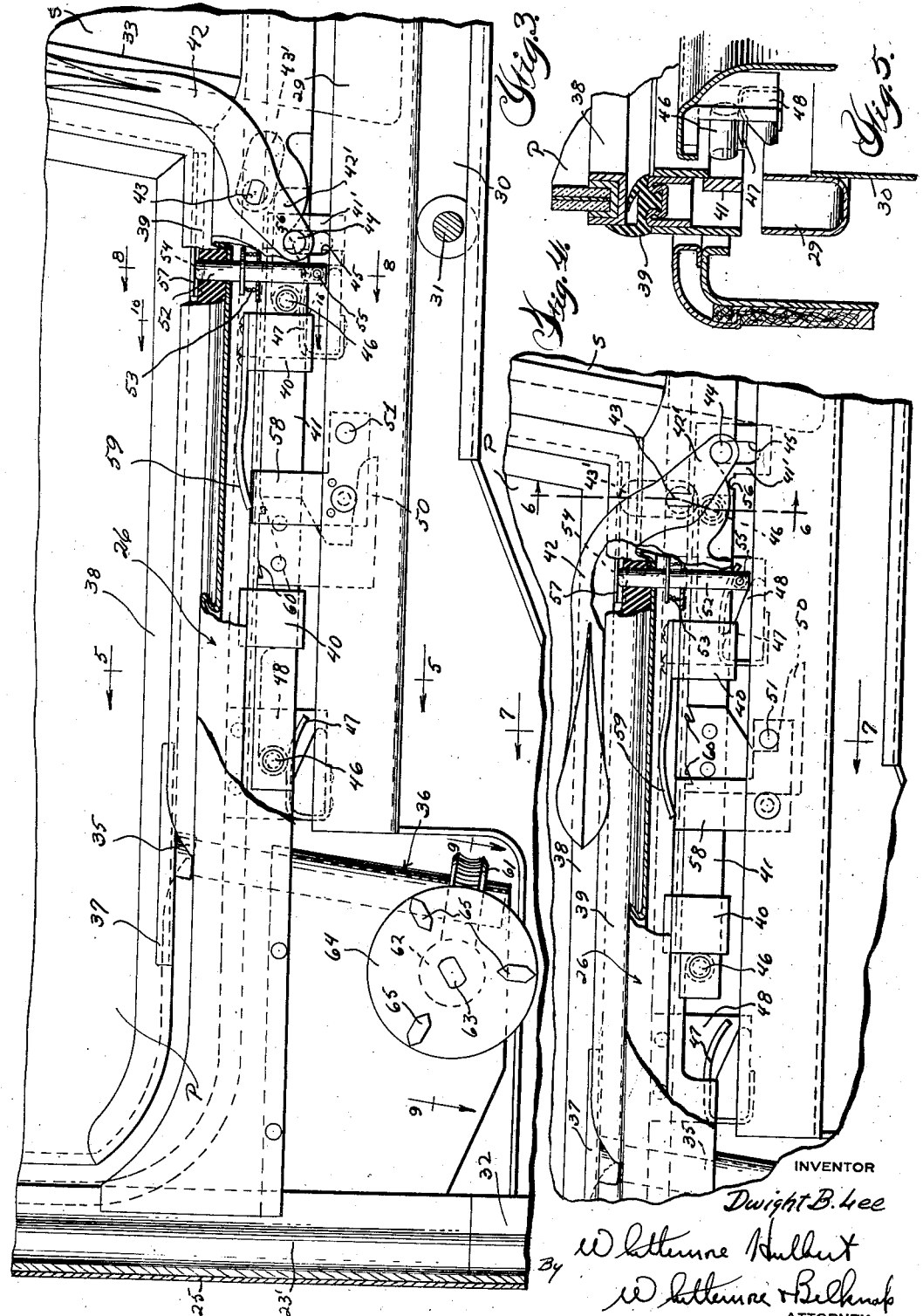

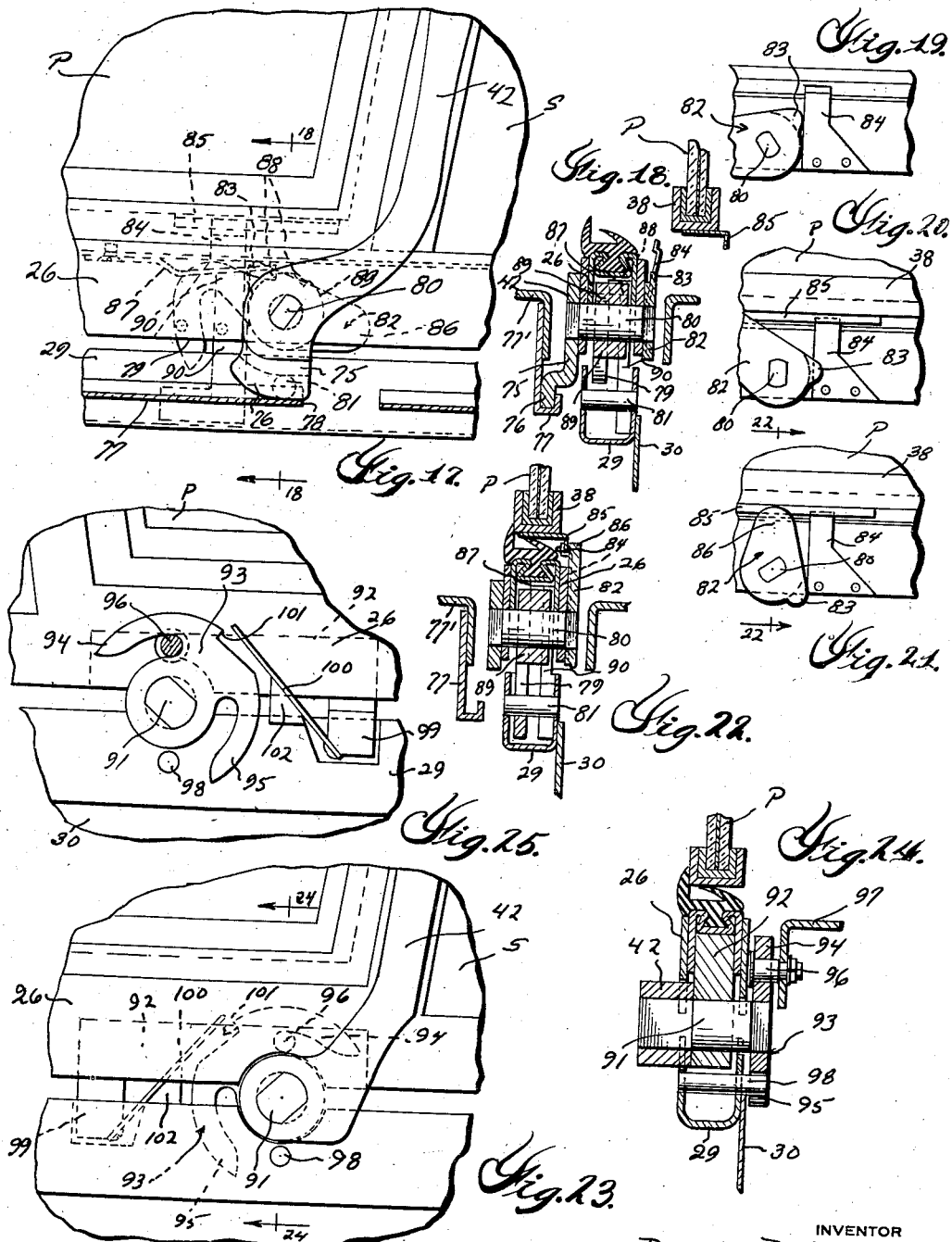

Patented July 26, 1938

2,124,922

UNITED STATES PATENT OFFICE 2,124,922

VEHICLE VENTILATING WINDOW

Dwight B. Lee, Detroit, Mich.

Application October 2, 1933, Serial No. 691,882

21 Claims. (Cl. 296—44)

This invention relates to vehicle ventilating windows and more particularly to ventilating windows particularly adapted for use with the closed bodies of motor vehicles and the like, and has as its principal objects to simplify, render more efficient, and improve generally structures of this type.

One of the objects of the invention is to provide a window structure for closed vehicle bodies so designed that the normal forward motion of the vehicle may be utilized to ventilate the interior of the vehicle without producing objectionable drafts.

Another object of the invention is to provide a ventilating window structure of this general character embodying pivoted and sliding panels operable independently of one another in effecting the control of the ventilation of the vehicle, and also operable as a unit so that they may be simultaneously raised into or lowered from the window opening.

Another object of this invention is to provide a ventilating window of the character referred to in which the conventional motor vehicle window lifter mechanism is employed both for raising and lowering the sliding panel, and for raising and lowering the entire window structure.

Another object of the invention is to provide a window construction of this nature having a single control lever operable to permit the simultaneous vertical adjustment of both the sliding and pivoted panels or the independent vertical adjustment of the sliding panel.

Another object of this invention is to provide a ventilating window structure of this character having means for preventing the vertical sliding movement of the pivoted panel, except in one position of the latter, and to prevent the pivotal movement of the pivoted panel when the latter is coupled to the window lifter mechanism for vertical adjustment.

Still another object of this invention is to provide means for actuating the pivoted panel operable only when this panel is in proper position in the window opening for pivotal movement.

Various other objects, advantages and novel details of construction of this invention will become more apparent as this description proceeds, especially when considered in connection with the accompanying drawings wherein several forms of construction embodying the principles of the invention have been illustrated, and in which drawings Figure 1 is a fragmentary perspective view of a portion of a closed motor vehicle body having my improved ventilating window associated therewith;

Figure 2 is a fragmentary perspective view of the structure shown in Figure 1, looking from the interior of the vehicle;

Figure 3 is an enlarged fragmentary sectional elevational view of a portion of the ventilating window showing the control mechanism therefor more in detail;

Figure 4 is a view of a portion of the structure illustrated in Figure 3 with the parts, however, shown in a different position;

Figure 5 is an enlarged fragmentary vertical sectional view taken substantially on the plane indicated by line 5—5 in Figure 3;

Figure 6 is a fragmentary vertical sectional view taken substantially on the plane indicated by line 6—6 in Figure 4;

Figure 7 is a view similar to Figure 6 taken substantially on the plane indicated by line 7—7 of Figure 4;

Figure 8 is a similar view taken substantially on the plane indicated by line 8—8 in Figure 3;

Figure 9 is a fragmentary horizontal sectional view taken substantially on the plane indicated by line 9—9 in Figure 3;

Figure 10 is a detail sectional view taken substantially on the plane indicated by line 10—10 in Figure 3;

Figures 11 and 11A are respectively detail perspective views of elements of the pivoted panel control means;

Figure 12 is a detail elevational view showing a modified form of control means;

Figure 13 is a detail elevational view of the structure shown in Figure 12, as seen from the opposite side;

Figure 14 is a detail sectional view taken substantially on the plane indicated by line 14—14 in Figure 12;

Figure 15 is a view similar to Figure 14 with the pivoted panel partly open;

Figure 16 is a detail sectional view taken substantially along the line 16—16 in Figure 15;

Figure 17 is a detail elevational view showing another modified form of control means;

Figure 18 is a detail sectional view taken substantially on the plane indicated by line 18—18 in Figure 17;

Figures 19, 20 and 21 are detail elevational views showing a portion of this modified form of control means in three different positions it assumes in operation;

Figure 22 is a view similar to Figure 18 with the pivoted ventilator completely closed;

Figure 23 is a fragmentary elevational view showing another modified form of control means;

Figure 24 is a detail sectional view taken substantially on the plane indicated by line 24—24 of Figure 23, and Figure 25 is a sectional elevational view of the structure shown in Figure 23.

Broadly the invention contemplates a ventilating window structure comprising a pivoted panel P and a sliding panel S adapted to cooperate to close a window opening 20 arranged, for instance, in the door 21 of a motor vehicle or the like 22, together with means for operating the pivoted and sliding panels independently of one another, and furthermore with means for simultaneously raising and lowering the pivoted and sliding panels as a unit.

The ventilating window is preferably, although not necessarily, associated with a front door located immediately to the rear of the side edge of the windshield W of the vehicle. As illustrated the windshield is preferably or usually inclined rearwardly, and as a consequence the adjacent edge of the pivoted panel P will be correspondingly inclined.

It will of course be apparent that the window opening 20 need not necessarily be in the door of the vehicle, and also that the invention is applicable for use in connection with other types of mobile vehicles.

Referring more particularly to Figures 1, 2 and 3, it will be noted that the structure comprises an inverted substantially U-shaped frame 23 having legs 23' thereof extending downwardly, this frame being adapted to be either raised into the window opening 20, as shown in Figures 1 and 2, or to be lowered into the well 24 of the vehicle body. This frame is vertically slidable in the usual vertically arranged channels 25. Extending transversely of the frame 23 intermediate the ends of the vertical legs 23' is a transverse frame member 26, the ends of which are rigidly connected to the vertical legs 23' of the frame 23. In the raised position of the frame 23 the upper portion of the frame is adapted to register or coincide with the window opening 20, whereas the transverse frame member 26 is located at substantially the level of the sill 27 of the window opening 20.

In Figure 2 there is illustrated fragmentarily a conventional type of window lifter mechanism having an operating handle 28 projecting from the face of the inner door panel, this window lifter mechanism also including (as shown more clearly in Figure 3) the customary glass support 29 and retainer 30. The reference character 31 indicates the pin or roller of the lifter arm which engages the retainer 30, the elements 29 and 30, as is customary, being adapted to be raised and lowered by the lifter mechanism through the engagement therewith of the pin or roller 31. The ends of the retainer 30 are provided with shoes 32 which form continuations of the legs 23' of the frame 23, and also slide in the usual channels 25.

The glass support 29 is secured to the lower edge of the sliding panel S so that this panel may be raised and lowered in the customary manner by the window lifter mechanism. Means, yet to be described, are also provided for coupling the vertically moving portion 29—30 of the window lifter mechanism with the frame 23 so that the entire frame can be also raised and lowered by the window lifter mechanism.

Extending vertically between the transverse frame member 26 and the top of the frame 23 is a divider 33 which separates the pivoted panel P from the sliding panel S and is grooved to provide a channel for guiding the adjacent edge of the sliding panel S. The opposite edge of the sliding panel S engages the adjacent leg 23' of the frame 23 which is likewise grooved to receive the edge of this sliding panel.

If desired, that portion of the frame 23 which extends around the sliding panel S may be eliminated. Under these conditions one edge of the panel S will slide in the groove in the divider 33 and the opposite edge will slide in the usual channel 25.

The pivoted panel P is mounted in the frame 23 on vertical or up-and-down pivots disposed intermediate the vertical edges of this panel P, the upper of these pivots being indicated by the reference character 34. The lower pivot for the pivoted panel P is indicated by the reference character 35 and is in the form of a shaft extending substantially vertically, the shaft being mounted in a housing 36 fixed to the transverse frame member 26. The upper end of the pivot shaft 35 is provided with a plate 37 which is secured to the metal frame 38 of the pivoted panel P, this frame being here shown as extending around approximately three sides of the pivoted panel P.

It will be understood that the opening in which the pivoted panel P is located is suitably weatherproofed by weatherstrips 39 which are engaged by the edges of the pivoted panel P when the latter is in closed position, that is, arranged in the plane of the frame 23.

The pivoted panel P is swung around its pivots through the medium of the pivot shaft 35 in a manner yet to be referred to.

Slidably mounted within the transverse frame member 26, as for instance by means of blocks 40, is a locking or control slide member or bar 41. This member is adapted to be moved longitudinally by means of a control or locking handle 42. This handle 42 is pivoted on a shaft 43 mounted in the frame member 26 and is provided in the end 42' thereof which projects beyond the pivot 43 with a pin 44 which engages in a slot 45 extending into a lateral extension 41' of the slide bar 41.

The control or locking handle 42 is adapted to be moved from its substantially vertical position illustrated in Figure 3 to its substantially horizontal position illustrated in Figure 4. When the handle 42 is in the position shown in Figure 3, the sliding panel S may be raised and lowered by the window lifter mechanism independently of the frame 23, the latter being then locked in position in the window opening. During this position of the parts the pivoted ventilator P is adapted to be operated independently of the sliding panel by being moved about its vertical pivots in the manner suggested probably best in Figures 1 and 2.

The slide bar 41 is provided with one or more, here shown as two, pins 46 adapted to engage in spring cam members 47 mounted as for instance by means 48 to the panel 49 of the vehicle door or body. This is accomplished when the handle is moved to its substantially vertical position such as illustrated in Figure 3, and thus the frame 23 is locked in position in the window opening. At the same time, the frame 23 is disengaged from the window lifter element 29—30 by the disengagement of a hook-shaped member 50 from a pin 51 carried by the window lifter element 29—30. This hook-shaped element is fixed to the slide bar 41 and moved therewith.

If the pivoted panel P is not completely closed it is desirable to provide means for preventing the movement of the control or locking handle 42 from the position shown in Figure 3 to that shown in Figure 4. This may be accomplished by means of a locking pin 52 mounted in the frame 26 for vertical movement and normally urged in an upward direction by means of a coil spring 53. This locking pin has its upper end beveled, as indicated at 54, and its lower end carries a laterally extending pin or projection 55 adapted to enter a notch or recess 56 in the lower edge of the slide bar 41. The lower frame 38 of the pivoted panel P is preferably provided with a plate 57 which, when the pivoted panel is completely closed, engages the beveled end 54 of locking pin 52 and depresses the same sufficiently to move the projection 55 out of the notch 56. When the parts are in this position, which is illustrated in Figures 3 and 8, the slide bar 41 may be moved. If, however, the pivoted panel is not completely closed the locking pin 52 will not be depressed and the engagement of the projection 55 in the recess 56 will prevent the sliding movement of the slide bar 41 and consequently prevent the movement of the handle 42 to the position shown in Figure 4 wherein the frame 23 is locked to the lifter mechanism and capable of being lowered thereby.

It is also desirable to prevent this movement of the handle and of the slide bar if the lifter mechanism element 29—30 is not completely raised because in such event it would be impossible to engage the hook-shaped member 50 with the pin 51. Thus the glass support 29 is provided with a projection 58 which, when the element 29—30 is completely raised, engages a flat spring 59 which normally engages any one of a number of notches 60 in the top edge of the slide bar 41. With the spring 59 thus engaged in the notch 60 it would be impossible to move the handle from its vertical position to its horizontal position as will be obvious, but when the lifter element 29—30 is completely raised, as shown in Figures 3 and 4, the spring 59 is raised clear of the notches 60 and does not interfere with the sliding movement of the slide bar 41.

Mounted on shaft 43 is a lug or arm 43' which is moved opposite the lower edge of panel P when the lever is in its substantially horizontal position to thus prevent movement of panel P to open position.

The arrangement of the means for operating the pivoted panel is such that it becomes operative only when this pivoted panel is in position in the window opening and capable of being swung about its pivots. By reference to Figures 3, 9, 11 and 11A the structure of this pivoted panel operating means will be described.

The housing 35 in which the pivot shaft 36 is mounted is secured to the frame member 26 of the main frame 23 for vertical movement therewith. The lower end of this shaft is provided with a worm wheel 61 which meshes with a worm 62 on a transversely extending shaft 63 also mounted in the housing 36. This shaft 63 has fixed thereto a disk-like clutch or gear member 64 provided with a plurality of teeth 65. Mounted on the inner panel 49 of the vehicle is a shaft 66, this shaft being provided with a disk 67 provided with a single tooth 68. The end of the shaft 66 which projects outside the inner panel 49 is provided with an operating handle or knob 69.

When the main frame 23 has been raised into registering position with the window opening 20 the disk 64 of the pivoted panel operating means is in registration with the disk 67 of the operating shaft 66 and thus when this shaft is rotated by means of the knob or handle 69 the clutch tooth 68 thereof will engage one of the teeth 65 of the clutch disk 64 and thus cause a rotation of the shaft 63. This will rotate the pivot shaft 35 through the worm gearing 62—61 and cause a swinging movement of the pivoted panel P as will be obvious. When, however, the main frame is out of registration with the window opening the clutch disks 64—67 are out of registration and rotative movement of the shaft 66 will not affect an operation of the pivoted panel P.

By reference to Figures 12 to 16 inclusive, a modified form of safety mechanism for preventing incorrect operation of the control or locking handle 42 will be described. In this form of construction a substantially disk-like member 70 is fixed to the shaft 43 for rotation with the handle 42. This locking disk 70 is provided with a notch or recess 71 in its periphery. Mounted in the channel 26 beneath the pivoted ventilator P is a spring finger or detent 72 having an end 73 thereof adapted to extend through an aperture in the frame 26 and through the recess or notch 71 in the disk 70 when this recess is in registration with the end 73 of this spring finger. Mounted on the frame 38 of the pivoted ventilator is a depending lug or projection 74 shaped to pass through the notch 71 in the locking disk 70.

With this construction, when the handle 42 is in its substantially vertical position such as illustrated in Figure 12 the notch 71 is in registration with the lug 74 and is also in position so that the end 73 of the spring finger may pass therethrough. Thus if the pivoted ventilator 38 is open the handle 42 cannot be moved because the end 73 of the spring finger 72 projects through the notch 71 of the locking disk. When, however, the pivoted ventilator is fully closed the lug 74 carried thereby passes through the notch 71 and moves the end 73 of the spring finger out of the notch 71, this movement being suggested in Figure 15 and being shown completed in Figure 14. Thus with the ventilator P fully closed, the handle 42 may be moved from its vertical position to its horizontal position whereupon the parts are in position to have the entire frame 23 together with the pivoted ventilator P lowered into the well. It will be obvious that when the handle has been moved to a substantially horizontal position the notch 71 is moved past the lug 74 so that it will be then impossible to open the pivoted ventilator. In the modification just described, it will be understood that the movement of handle 42 operates the slide bar 41 which functions in the same manner as the first described form of construction.

In Figures 17 to 22 another modified form of means for preventing incorrect operation of the control handle 42 is illustrated together with a modified form of means for locking the frame 23 to the window lifter element 29—30 as well as locking the frame 23 in its raised position.

For holding the frame 23 in its raised position the lever 42 is provided with an end 75 extending beyond the pivot 80 of this lever which projecting end is preferably finished with a curved cam-like end face 76. In the upright or vertical position of the lever 42 this cam-like portion 76 is adapted to engage in a return-bent ledge or the like constituting a support 77 carried by the panel 77'. When the lever 42 is moved to its substantially horizontal position this cam portion 76 is disengaged from the supporting ledge 77 and in the vertical movement of the frame passes through an opening 78 formed in this supporting ledge.

When the handle is moved to its horizontal position a hook-shaped member 79 which is fixed to the shaft 80 which rotates with the handle, engages a pin 81 fixed to the glass support 29 of the window lifter element 29—30. This therefore connects the frame 23 with the window lifter mechanism so that the frame will be raised and lowered upon the operation of the lifter mechanism.

Also fixed to the shaft 80 is a safety plate 82 provided at one end with a lug 83 adapted to engage an abutment plate 84 when this latter plate is not moved out of the path of this lug 83. For moving the abutment plate 84 out of the path of the lug 83 the frame 38 of the pivoted panel P is provided with a downwardly projecting lug or plate 85 which, when the pivoted panel is completely closed, engages the upper end of the abutment plate 84 and moves the same out of the path of the lug 83. This operation is suggested in Figures 18 and 22, the pivoted ventilator being shown partly open in Figure 18 and completely closed in Figure 22. It will be understood that the abutment plate 84 is formed preferably of spring metal and tends to normally spring outwardly into the path of the lug 83 as suggested in Figure 18.

The other end 86 of the safety plate 82 is moved opposite the lower edge of the pivoted panel P when the handle 42 is in its substantially horizontal position to thereby prevent the swinging of the pivoted panel P to open position.

In order to prevent rotation of the handle 42, unless the window lifter mechanism element 29—30 is fully raised, I provide a flat spring 87 fixed to the cross frame 26 the free end of this spring engaging in any one of a plurality of notches 88 formed in a member 89 fixed to the shaft 80. When, however, the window lifter mechanism element 29—30 is fully raised a projection 90 carried thereby engages the underside of this spring 87 to lift the same out of the notch 88 and permit rotation of the handle 42.

In Figures 23 to 25 inclusive, still another modified form of means for locking the main frame to the stationary panel and to the window lifter mechanism is illustrated. In these figures, the reference character 91 indicates the shaft upon which the handle 42 is mounted. A block 92 may be arranged in the frame member 26 to provide a journal for the shaft 91. Fixed to the shaft 91 for rotation therewith is a locking member 93 having hook-shaped portions 94 and 95. The hook portion 94 is adapted in the vertical position of the handle to engage a pin 96 carried by the stationary panel 97 of the vehicle, whereas the hook portion 95 is adapted to engage a pin 98 carried by the glass support 29 of the window lifter mechanism 29—30. Thus when the handle is in its substantially vertical position illustrated in Figure 23, the pin 96 will be engaged by the locking member 93 to lock the frame 23 in its upper position in registration with the window opening, whereas when the handle is in its substantially horizontal position the locking member will be disengaged from this pin and will engage the pin 98 carried on lifter mechanism parts 29—30 so that the frame 23 can be raised and lowered when the window lifter mechanism is actuated.

The block 92 is provided with a lateral extension 99 to which a flat spring 100 may be secured, this spring being adapted to engage a notch 101 formed in the locking member 93. This spring 100 will remain in engagement with the notch 101 unless the window lifter part 29—30 is completely raised, in which event a projection 102 carried on the part 29 lifts the spring 100 from engagement with the notch 101 and permits operative movement of the handle 42.

From the foregoing description and the accompanying drawings wherein several embodiments of the invention have been illustrated and described, it will be readily apparent that the invention broadly is capable of expression in various combinations and arrangements of mechanical elements. In each form of construction illustrated, however, a ventilating window structure is provided in which sliding and pivoted panels cooperate to close the window opening, means being provided for independently operating both the sliding and pivoted panels and of simultaneously both raising and lowering both panels as a unit. The invention also contemplates broadly the provision of means for preventing the incorrect or improper actuation of the control or locking lever and consequently an untimely actuation of the pivoted panel. In addition to the broad inventive principles involved, the invention consists in the novel combination, construction and arrangement of parts herein described and illustrated somewhat in detail.

While several forms of the invention have been described and illustrated in detail, reservation is made to make such other changes, modifications and rearrangements as may come within the purview of the accompanying claims.

What I claim as my invention is:

1. A ventilating window construction for a vehicle body comprising a window casing, a frame slidable in said casing into and out of registration with the window opening, a panel pivotally mounted in said frame on substantially vertically arranged pivots for closing a portion of the window opening, a second panel slidably mounted in said frame and cooperating with said pivoted panel to close said window opening, a window lifter mechanism for actuating said slidable panel independently of said pivoted panel, and means for coupling said frame with said lifter mechanism for simultaneously moving the frame and said sliding and pivoted panels into and out of registration with said window opening.

2. A ventilating window construction for a vehicle body comprising a window casing, a frame slidable in said casing into and out of registration with the window opening, a panel pivotally mounted in said frame on substantially vertically arranged pivots for closing a portion of the window opening, a second panel slidably mounted in said frame and cooperating with said pivoted panel to close said window opening, a window lifter mechanism for actuating said slidable panel independently of said pivoted panel, means for securing said frame in registration with said window opening, means for coupling said frame to said lifter mechanism for movement thereby, and a control element for selectively rendering one of said last mentioned means operative.

3. In a ventilating window construction for a vehicle body comprising a window casing, a frame slidable in said casing into and out of registration with the window opening, a panel pivotally mounted in said frame on substantially vertically arranged pivots for closing a portion of the window opening, a second panel slidably mounted in said frame and cooperating with said pivoted panel to close said window opening, a window lifter mechanism for actuating said slidable panel independently of said pivoted panel, and a control lever having means actuated thereby in one position of the lever for locking said frame in registration with the window opening, and having means actuated thereby in another position of the lever for coupling said frame with said lifter mechanism whereby said frame and sliding and pivoted panels may be simultaneously moved into and out of registration with the window opening upon actuation of said lifter mechanism.

4. A ventilating window construction for a vehicle body comprising a window casing, a frame slidable in said casing into and out of registration with the window opening, a panel pivotally mounted in said frame on substantially vertically arranged pivots for closing a portion of the window opening, a second panel slidably mounted in said frame and cooperating with said pivoted panel to close said window opening, a window lifter mechanism connected to said slidable panel, means for locking said frame to a stationary part of the window casing in registration with the window opening, means for coupling said frame to said window lifter mechanism, a control element for selectively rendering one of said latter mentioned means operative, and means controlled by said pivoted panel for preventing incorrect operation of said control element.

5. A ventilating window construction for a vehicle body comprising a window casing, a frame slidable in said casing into and out of registration with the window opening, a panel pivotally mounted in said frame on substantially vertically arranged pivots for closing a portion of the window opening, a second panel slidably mounted in said frame and cooperating with said pivoted panel to close said window opening, a window lifter mechanism connected to said slidable panel, means for locking said frame to a stationary part of the window casing in registration with the window opening, means for coupling said frame to said window lifter mechanism, a control element for selectively rendering one of said last mentioned means operative, and means controlled by said lifter mechanism to prevent an untimely operation of said coupling means by said control element.

6. A ventilating window construction for a vehicle body comprising a window casing, a frame slidable in said casing into and out of registration with the window opening, a panel pivotally mounted in said frame on substantially vertically arranged pivots for closing a portion of the window opening, a second panel slidably mounted in said frame and cooperating with said pivoted panel to close said window opening, a window lifter mechanism connected to said slidable panel, means for locking said frame to a stationary part of the window casing in registration with the window opening, means for coupling said frame to said window lifter mechanism, a control lever for selectively rendering said locking means or said coupling means operative and the other inoperative, means controlled by said pivoted panel for preventing an actuation of said control lever when said pivoted panel is open, and means controlled by said lifter mechanism to prevent the coupling movement of said control lever unless said lifter mechanism is in position to be coupled to said frame.

7. A ventilating window construction for a vehicle body comprising a window casing, a frame slidable in said casing into and out of registration with the window opening, a panel pivotally mounted in said frame on substantially vertically arranged pivots for closing a portion of the window opening, a second panel slidably mounted in said frame and cooperating with said pivoted panel to close said window opening, a window lifter mechanism connected to said slidable panel, a slide bar mounted on said frame, means on said slide bar engageable with means on a stationary part of the window casing for locking said frame in position in registration with the window opening, other means carried by said slide bar engageable with said window lifter mechanism for coupling said frame to said lifter mechanism, and a control lever for shifting said slide bar to selectively render operative said locking means and coupling means.

8. A ventilating window construction for a vehicle body comprising a window casing, a frame slidable in said casing into and out of registration with the window opening, a panel pivotally mounted in said frame on substantially vertically arranged pivots for closing a portion of the window opening, a second panel slidably mounted in said frame and cooperating with said pivoted panel to close said window opening, a window lifter mechanism connected to said slidable panel, a slide bar mounted on said frame, means on said slide bar engageable with means on a stationary part of the window casing for locking said frame in position in registration with the window opening, other means carried by said slide bar engageable with said window lifter mechanism for coupling said frame to said lifter mechanism, a control lever for shifting said slide bar to selectively render operative said locking means and coupling means, and a locking pin normally engaging said slide bar to prevent movement thereof, said locking pin being engaged by said pivoted panel in the closed position of the latter to render said locking pin inoperative.

9. A ventilating window construction for a vehicle body comprising a window casing, a frame slidable in said casing into and out of registration with the window opening, a panel pivotally mounted in said frame on substantially vertically arranged pivots for closing a portion of the window opening, a second panel slidably mounted in said frame and cooperating with said pivoted panel to close said window opening, a window lifter mechanism connected to said slidable panel, a slide bar mounted on said frame, means on said slide bar engageable with means on a stationary part of the window casing for locking said frame in position in registration with the window opening, other means carried by said slide bar engageable with said window lifter mechanism for coupling said frame to said lifter mechanism, a control lever for shifting said slide bar to selectively render operative said locking means and coupling means, means normally engaging said slide bar to prevent movement of the same in one direction, and means carried by said lifter mechanism and operable in one position of the latter for releasing said locking means.

10. A ventilating window construction for a vehicle body comprising a window casing, a frame slidable in said casing into and out of registration with the window opening, a panel pivotally mounted in said frame on substantially vertically arranged pivots for closing a portion of the window opening, a second panel slidably mounted in said frame and cooperating with said pivoted panel to close said window opening, a window lifter mechanism connected to said slidable panel, means for locking said frame to a stationary part of said window casing including a slide bar carried by said frame, a resilient supporting cam carried by said window casing, a projection on said slide bar engageable with said resilient supporting cam, and a control lever for actuating said slide bar to engage the projection thereof with said resilient supporting cam.

11. A ventilating window construction for a vehicle body comprising a window casing, a frame slidable in said casing into and out of registration with the window opening, a panel pivotally mounted in said frame on substantially vertically arranged pivots for closing a portion of the window opening, a second panel slidably mounted in said frame and cooperating with said pivoted panel to close said window opening, a window lifter mechanism connected to said slidable panel, a slide bar mounted on said frame, means on said slide bar engageable with means on a stationary part of the window casing for locking said frame in position in registration with the window opening, other means carried by said slide bar engageable with said window lifter mechanism for coupling said frame to said lifter mechanism, a control lever for shifting said slide bar to selectively render said locking means and coupling means operative, a locking disk rotatable with said control lever and provided with a peripheral recess, a resilient locking finger carried by said frame and normally extending in a direction to enter said locking disk recess when the control lever is in one position, and a depending projection carried by said pivoted panel and adapted to pass through said recess to disengage said resilient locking finger from said disk when said pivoted panel is moved to closed position, thereby permitting movement of said control lever and the consequential rotation of said disk to bring the recess therein out of registration with said depending projection whereby the movement of said pivoted panel to open position is prevented.

12. A ventilating window construction for a vehicle body comprising a window casing, a frame slidable in said casing into and out of registration with the window opening, a panel pivotally mounted in said frame on substantially vertically arranged pivots for closing a portion of the window opening, a second panel slidably mounted in said frame and cooperating with said pivoted panel to close said window opening, a window lifter mechanism connected to said slidable panel, a control lever, means on said control lever engageable with said window casing for locking said frame in position in registration with the window opening, other means connected to said control lever for coupling said frame with said window lifter mechanism, means connected to said control lever for preventing swinging movement of said pivoted panel during the time the control lever is in one position, an abutment acting in one position to prevent movement of said control lever, and means carried by said pivoted panel for moving said abutment to inoperative position when said pivoted panel is moved to closed position.

13. A ventilating window construction for a vehicle body comprising a window casing, a frame slidable in said casing into and out of registration with the window opening, a panel pivotally mounted in said frame on substantially vertically arranged pivots for closing a portion of the window opening, a second panel slidably mounted in said frame and cooperating with said pivoted panel to close said window opening, a window lifter mechanism connected to said slidable panel, a control lever, a member movable with said control lever and provided with two hook-shaped portions, a fixed member on said casing engageable while one of said hook-shaped members is in one position of said control member, the other hook-shaped member being engageable with said window lifter mechanism in another position of said control lever, as and for the purpose set forth.

14. In a door construction for automobiles, the combination of a door frame, a window frame slidably mounted in said door frame, a pair of windows mounted in said window frame and movable therewith and means for raising and lowering one of said windows independent of the other window, one of said windows being pivotally mounted in said frame and movable about its pivot independent of the other window.

15. In an automobile door construction, the combination of a door frame, a window frame slidably mounted in said door frame and including a sash the bottom member of which is movable with respect thereto, a window pivotally secured to said sash, a second window slidably mounted in said sash and connected with said bottom member, means for raising and lowering said bottom member and second window, and means operable to connect said sash with said bottom member so that both of said windows may be raised and lowered together.

16. In an automobile door construction, the combination of a door frame, a window frame slidably mounted in said door frame and including a sash the bottom member of which is movable with respect thereto, a window pivotally secured to said sash, a second window slidably mounted in said sash and connected with the said bottom member, means for raising and lowering said bottom member and second window independent of said first window and means operable to cause said first window to move up and down with said second window.

17. In a door construction for automobiles, the combination of a door frame, a window frame slidably mounted in said door frame, a pivotally mounted window on said window frame, a window mounted for sliding movement relative to said window frame, means for raising and lowering said frame, means for raising and lowering said slidable panel independently of said frame.

18. In a door construction for automobiles, the combination of a door frame, a window frame slidably mounted in said door frame, a pivotally mounted window on said window frame, a window mounted for sliding movement relative to said window frame, means for raising and lowering said frame, means for raising and lowering said slidable panel independently of said frame, and means preventing movement of said frame when said pivotally mounted window is in other than closed position.

19. In a door construction for automobiles, the combination of a door frame, a window frame slidably mounted in said door frame, a pivotally mounted window on said window frame, a window mounted for sliding movement relative to said window frame, means for raising and lowering said frame, means for raising and lowering said slidable panel independently of said frame, and single operating means for operating either of said last mentioned means.

20. In a door construction for automobiles, the combination of a door frame, a window frame slidable in said door frame, a pair of windows mounted in said window frame and movable therewith, one of said windows being pivotally mounted on said frame, the other window being slidable in said window frame, lifting means, a device for connecting said lifting means to said frame or to said slidable window as desired.

21. In a door construction for automobiles, the combination of a door frame, a window frame slidable in said door frame, a pair of windows mounted in said window frame and movable therewith, one of said windows being pivotally mounted on said frame, the other window being slidable in said window frame, lifting means, a device for connecting said lifting means to said frame or to said slidable window as desired, and means for pivoting said pivotally mounted window operable only when said window frame is in elevated position.

DWIGHT B. LEE.